United States Patent
Akamatsu et al.

(10) Patent No.: US 10,662,022 B2
(45) Date of Patent: May 26, 2020

(54) OPTICAL FIBER WINDING BOBBIN, OPTICAL FIBER WINDING METHOD, AND BOBBIN-WOUND OPTICAL FIBER

(71) Applicant: FUJIKURA LTD., Tokyo (JP)

(72) Inventors: Tsuyoshi Akamatsu, Suzuka (JP); Taku Onodera, Suzuka (JP); Satoshi Matsunaga, Suzuka (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/068,461

(22) PCT Filed: Dec. 6, 2016

(86) PCT No.: PCT/JP2016/086179
§ 371 (c)(1),
(2) Date: Jul. 6, 2018

(87) PCT Pub. No.: WO2017/168846
PCT Pub. Date: Oct. 5, 2017

(65) Prior Publication Data
US 2019/0016556 A1 Jan. 17, 2019

(30) Foreign Application Priority Data
Mar. 31, 2016 (JP) .................. 2016-083216

(51) Int. Cl.
*B65H 75/14* (2006.01)
*B65H 75/28* (2006.01)
*G02B 6/44* (2006.01)

(52) U.S. Cl.
CPC ........... *B65H 75/14* (2013.01); *B65H 75/145* (2013.01); *B65H 75/28* (2013.01); *G02B 6/4457* (2013.01); *B65H 2701/32* (2013.01)

(58) Field of Classification Search
CPC ...... B65H 75/14; B65H 75/145; B65H 75/18; B65H 2701/32; G02B 6/4457
See application file for complete search history.

(56) References Cited

U.S. PATENT DOCUMENTS

| 4,696,438 A | 9/1987 | Myers |
| 6,533,216 B1 | 3/2003 | Bumgarner et al. |
| (Continued) | | |

FOREIGN PATENT DOCUMENTS

| CN | 87107971 A | 8/1988 |
| CN | 1332693 A | 1/2002 |
| (Continued) | | |

OTHER PUBLICATIONS

Office Action issued in Chinese Application No. 201680082219.8, dated Apr. 18, 2019 (7 pages).
(Continued)

Primary Examiner — William E Dondero
(74) Attorney, Agent, or Firm — Osha Liang LLP (57) ABSTRACT

An optical fiber winding bobbin includes: a main winding body portion having an outer circumferential surface around which an optical fiber is wound; and a main winding flange that is disposed on one end portion of the main winding body portion in an axial direction and that protrudes radially outward. The main winding flange includes: an inner circumferential edge portion connected to the main winding body portion; a central portion; and an outer circumferential portion having a thin portion and positioned outward from the central portion in a radial direction. An axial thickness of the thin portion is smaller than an axial thickness of the inner circumferential edge.

10 Claims, 3 Drawing Sheets

(56) References Cited

U.S. PATENT DOCUMENTS 7,954,748 B2    6/2011  Weissbrod
2004/0050996 A1  3/2004  Russell et al.

FOREIGN PATENT DOCUMENTS

| | | |
|---|---|---|
| CN | 1467148 A | 1/2004 |
| CN | 103958384 A | 7/2014 |
| JP | S49-010073 U | 1/1974 |
| JP | S56-099175 A | 8/1981 |
| JP | H02-037171 U | 3/1990 |
| JP | H05-338923 A | 12/1993 |
| JP | H09-315693 A | 12/1997 |
| JP | 2003-137588 A | 5/2003 |
| JP | 2009-274829 A | 11/2009 |
| JP | 4806062 B2 | 11/2011 |
| JP | 2013-116816 A | 6/2013 |
| WO | 0040495 A1 | 7/2000 |
| WO | 2013/084797 A1 | 6/2013 |

OTHER PUBLICATIONS

Office Action issued in corresponding Japanese Application No. 2016-083216 dated Sep. 4, 2018 (34 pages).

OPTICAL FIBER WINDING BOBBIN, OPTICAL FIBER WINDING METHOD, AND BOBBIN-WOUND OPTICAL FIBER

TECHNICAL FIELD

The present invention relates to an optical fiber winding bobbin, an optical fiber winding method, and a bobbin-wound optical fiber.

Priority is claimed on Japanese Patent Application No. 2016-083216, filed on Mar. 31, 2016, the content of which is incorporated herein by reference.

BACKGROUND ART

As a bobbin for winding an optical fiber strand or a coated optical fiber (in the present specification, these will be collectively referred to as an optical fiber), for example, a bobbin, whose main winding flanges are provided with both ends of a cylindrical main winding body portion as disclosed in Patent Document 1, is used. In addition, when shipping an optical fiber, the optical fiber is generally shipped in the form of a product obtained by winding the optical fiber on a bobbin, that is, in the form of a bobbin-wound optical fiber.

CITATION LIST

Patent Literature

[Patent Document 1] Japanese Patent No. 4806062

Meanwhile, when this type of optical fiber winding bobbin is used to wind an optical fiber, the optical fiber winding bobbin may be rotated at a high speed. When the optical fiber winding bobbin is rotated at a high speed, optical fiber winding bobbin may vibrate due to a centrifugal force acting on the main winding flanges, which causes deformation of the optical fiber winding bobbin or a decrease in durability.

Meanwhile, when the optical fiber winding bobbin is detached from a winding machine after the optical fiber is wound, an axial external force may act on the main winding flanges of the optical fiber winding bobbin. When the weight of the main winding flanges is decreased in order to decrease the centrifugal force acting on the main winding flanges, there is a possibility of a decrease in rigidity and strength of the main winding flanges in an axial direction, the main winding flanges being deformed due to the external force, or the like.

SUMMARY

One or more embodiments of the invention can decrease a centrifugal force acting on main winding flanges while preventing a decrease in rigidity and strength of the main winding flanges of an optical fiber winding bobbin in an axial direction.

An optical fiber winding bobbin according to one or more embodiments of the invention includes a main winding body portion that an optical fiber is able to be wound on an outer circumferential surface and a main winding flange that is provided on one end portion of the main winding body portion in an axial direction and that protrudes radially outward. A thin portion, of which an axial thickness is smaller than an axial thickness of an inner circumferential edge portion connected to the main winding body portion, is formed at an outer circumferential portion of the main winding flange, which is positioned outward of a central portion in a radial direction.

According to the optical fiber winding bobbin in the above-described embodiments, the thin portion is formed at the outer circumferential portion of the main winding flange. Therefore, it is possible to decrease a centrifugal force acting on the entire main winding flange by decreasing the mass of the outer circumferential portion of the main winding flange, which generates a great centrifugal force. Furthermore, it is possible to prevent a decrease in rigidity and strength of the main winding flange in the axial direction by increasing the thickness of the inner circumferential edge portion of the main winding flange, which is connected to the main winding body portion.

Here, an axial thickness of an inner circumferential portion of the main winding flange, the inner circumferential portion being positioned inward of the central portion in the radial direction, may be larger than an axial thickness of the thin portion.

Stress is likely to concentrate on the inner circumferential portion of the main winding flange when an axial external force acts on the main winding flange. With this regard, it is possible to improve the rigidity and the strength of the inner circumferential portion in the axial direction by increasing the thickness of the inner circumferential portion. In addition, since a distance from the central axis to the inner circumferential portion of the main winding flange is short, even when the thickness of the inner circumferential portion is increased, it is possible to prevent an increase in centrifugal force acting on the entire main winding flange.

In addition, an axial thickness of the thin portion may gradually decrease toward a radially outer side.

In this case, for example, in comparison with an optical fiber winding bobbin in which the thickness of the main winding flange decreases toward the radially outer side in a stepwise manner, stress is prevented from concentrating on the main winding flange when an axial external force acts on the main winding flange and the strength of the main winding flange can be improved.

In addition, a reinforcement ring that protrudes axially outward may be formed over an entire circumference of an outer circumferential edge of the main winding flange.

In this case, the rigidity of the main winding flange in the axial direction can be further improved by the reinforcement ring. In addition, a centrifugal force acting on the entire main winding flange, which is generated by the mass of the reinforcement ring, can be made small by making the mass of the reinforcement ring sufficiently small in comparison with the mass of the main winding flange.

In addition, a rib that protrudes axially outward from an outer surface of the main winding flange, the outer surface facing an axially outer side, may be formed on the outer surface.

In this case, the rigidity of the main winding flange in the axial direction can be further improved by the rib. In addition, a centrifugal force acting on the entire main winding flange, which is generated by the mass of the rib, can be made small by making the mass of the rib sufficiently small in comparison with the mass of the main winding flange.

In addition, a slit that extends in the radial direction over an area from the inner circumferential edge portion to an outer circumferential edge of the main winding flange may be formed in the main winding flange and the rib may be formed on each of portions of the outer surface, a portion included in the portions of the outer surface being adjacent to a radially inner end of the slit in a circumferential direction, and a portion included in the portions of the outer surface, which is positioned on a side opposite to the portion adjacent to the radially inner end of the slit in the radial direction, and a central axis of the main winding flange may be interposed between the portions of the outer surface in the radial direction.

In this case, it is possible to improve the strength of the base portion by forming the rib in the vicinity of the base portion of the slit of the main winding flange, on which stress caused by a centrifugal force or an axial external force is likely to concentrate. Furthermore, the rib is also formed on a side opposite to the base portion with the central axis interposed therebetween. Therefore, the center of gravity of the optical fiber winding bobbin is positioned on the center of the rotation. It is possible to decrease vibration, which occurs when the optical fiber winding bobbin is rotated.

An optical fiber winding method according to one or more embodiments of the invention includes fixing a winding-start side terminal portion of an optical fiber to the optical fiber winding bobbin and winding the optical fiber on the outer circumferential surface of the main winding body portion by rotating the optical fiber winding bobbin.

According to the optical fiber winding method in the above-described embodiments, it is possible to decrease a centrifugal force acting on the entire main winding flange while preventing a decrease in strength and rigidity of the inner circumferential edge portion of the main winding flange. Therefore, it is possible to improve the efficiency of a step of winding an optical fiber on the main winding body portion by increasing a rotation rate at which the optical fiber winding bobbin is rotated, for example.

A bobbin-wound optical fiber according to one or more embodiments of the invention includes the optical fiber winding bobbin and an optical fiber wound on the optical fiber winding bobbin.

According to the bobbin-wound optical fiber in the above-described embodiments, it is possible to prevent a decrease in strength and rigidity of the inner circumferential edge portion of the main winding flange. Therefore, it is possible to prevent deformation or the like of the main winding flange that occurs in a case where an unintended great external force is applied to the main winding flange when the bobbin-wound optical fiber is transported or used.

According to one or more embodiments of the invention, it is possible to decrease a centrifugal force acting on a main winding flange while preventing a decrease in rigidity and strength of the main winding flange of an optical fiber winding bobbin in an axial direction.

DETAILED DESCRIPTION

Hereinafter, a configuration of an optical fiber winding bobbin according to one or more embodiments will be described with reference to FIG. 1.

Figure 1:
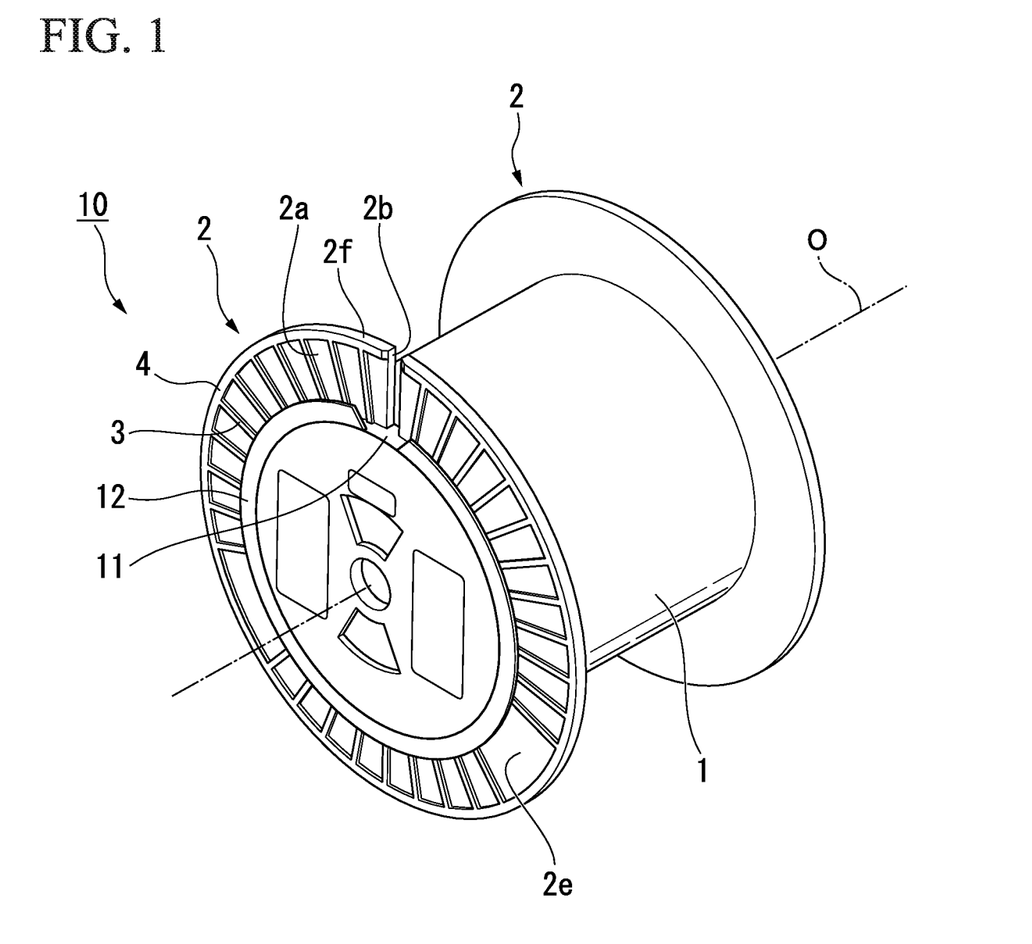
FIG. 1 is a perspective view of an optical fiber winding bobbin according to one or more embodiments.

As shown in FIG. 1, an optical fiber winding bobbin 10 according to one or more embodiments is provided with a cylindrical main winding body portion 1 and a pair of circular plate-shaped main winding flanges 2 which are respectively provided on both axial end portions of the main winding body portion 1.

Here, in one or more embodiments, a central axis of the main winding flange 2 is disposed on a common axis with a central axis of the main winding body portion 1. Hereinafter, the common axis will be referred to as a central axis O and a direction parallel to the central axis O will be referred to as an axial direction. In addition, a direction orthogonal to the central axis O in a side view as seen from the axial direction will be referred to as a radial direction. A direction around the central axis O will be referred to as a circumferential direction. In addition, a side on which the main winding body portion 1 is disposed as seen from the main winding flange 2 in the axial direction will be referred to as an axially inner side and a side opposite to the axially inner side will be referred to as an axially outer side.

An auxiliary winding body portion 11, which is formed in a cylindrical shape having an outer diameter equal to the outer diameter of the main winding body portion 1, is disposed axially outward of the main winding flange 2. An auxiliary winding flange 12 is disposed axially outward of the auxiliary winding body portion 11. The auxiliary winding flange 12 is formed in a circular plate-like shape having an outer diameter smaller than the outer diameter of the main winding flange 2.

The auxiliary winding body portion 11 and the auxiliary winding flange 12 may be provided axially outward of each of the pair of main winding flanges 2. Alternatively, the auxiliary winding body portion 11 and the auxiliary winding flange 12 may be provided axially outward of only one main winding flange 2 out of the pair of main winding flanges 2.

(Main Winding Flange)

Figure 2:
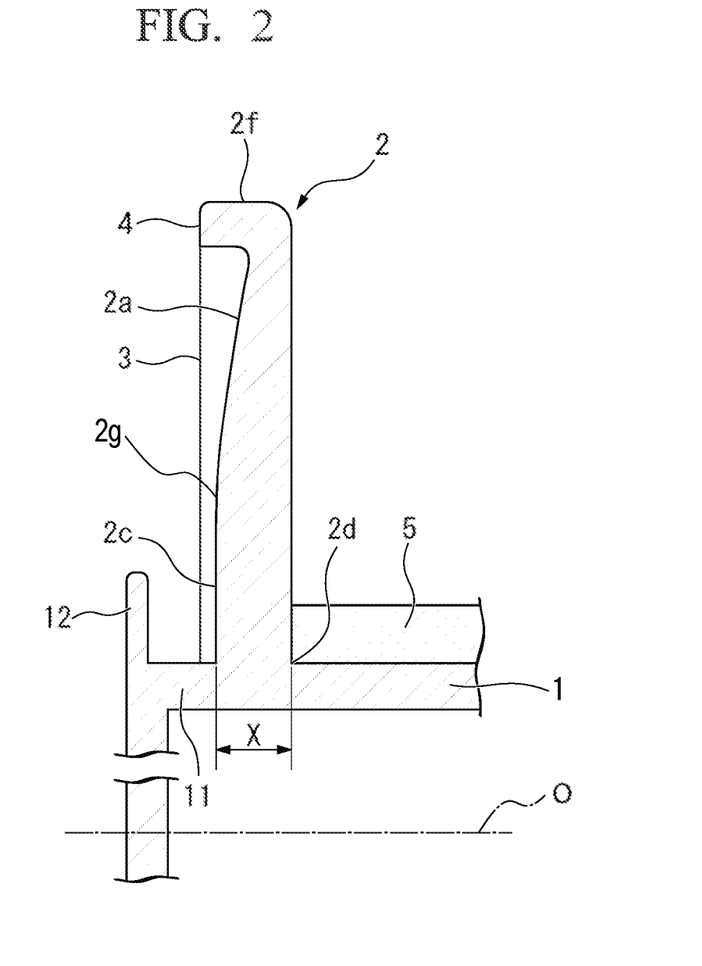
FIG. 2 is a sectional view of the optical fiber winding bobbin shown in FIG. 1.

As shown in FIG. 2, the main winding flange 2 protrudes radially outward from an outer circumferential surface of the main winding body portion 1. A thin portion 2a is formed at an outer circumferential portion of the main winding flange 2, which is positioned outward of a central portion 2g in the radial direction. The axial thickness of the thin portion 2a is smaller than the axial thickness of an inner circumferential edge portion 2d, the inner circumferential edge portion 2d being connected to the main winding body portion 1. Here, the axial thickness of the inner circumferential edge portion 2d refers to the axial thickness of the main winding flange 2 on an outer circumferential surface of the main winding body portion 1. Specifically, a dimension X shown in FIG. 2 is the axial thickness of the inner circumferential edge portion 2d.

In addition, in one or more embodiments, the thickness of an inner circumferential portion 2c of the main winding flange 2 is constant up to the central portion 2g of the main winding flange 2 in the radial direction, the inner circumferential portion 2c being positioned inward of the central portion 2g in the radial direction. In addition, the thickness of the thin portion 2a gradually decreases toward a radially outer side.

In addition, an axially inner side surface of the main winding flange 2 is erected with respect to the main winding body portion 1. Therefore, when optical fibers are wound around the main winding body portion 1, the optical fibers are aligned in the axial direction, and are stacked in the radial direction. Therefore, it is possible to prevent from collapsing a coil of the optical fibers. Since the axially inner side surface of the main winding flange 2 comes into contact with the optical fibers stacked in the radial direction, the axially inner side surface receives a pressure toward the axially outer side which is caused by the tension of the optical fiber.

On an outer circumferential edge 2f of the main winding flange 2, a reinforcement ring 4 that protrudes axially outward is formed. The reinforcement ring 4 is formed over (i.e., covers) the entire circumference of the outer circumferential edge 2f in the circumferential direction. In addition, a slit 2b that extends in the radial direction over an area from the reinforcement ring 4 to the outer circumferential surface of the main winding body portion 1 is formed in the main winding flange 2.

The reinforcement ring 4 may not be formed on the main winding flange 2. In this case, the slit 2b may extend in the radial direction over an area from the inner circumferential edge portion 2d of the main winding flange 2 to the outer circumferential edge 2f.

On an outer surface of the main winding flange 2, which faces the axially outer side, ribs 3 that protrude axially outward from the outer surface are formed. In one or more embodiments, a plurality of ribs 3 are radially formed around the central axis O. As shown in FIG. 2, an axially outer end surface of the rib 3 and an axially outer end surface of the reinforcement ring 4 are formed to be flush with each other (i.e., even or level, so as to form the same plane).

As shown in FIG. 1, on the outer surface of the main winding flange 2, which faces the axially outer side, a pasting surface 2e at which the ribs 3 are formed at wider intervals than other portions is formed. The pasting surface 2e is used to paste a winding-start end portion of an optical fiber, which will be described later.

In one or more embodiments, the main winding flange 2, the ribs 3, and the reinforcement ring 4 are integrally formed with each other. However, the main winding flange 2 provided with no rib 3 and no reinforcement ring 4 may also be used.

In addition, as shown in FIG. 2, a shock absorbing member 5 may be wrapped on the outer circumferential surface of the main winding body portion 1. In this case, it is possible to reduce an excessive pressure that acts from an upper layer to a lower layer of an optical fiber wound on the outer circumferential surface of the main winding body portion 1, when the optical fiber is wound on the main winding body portion 1 and a tension of the optical fiber is generated. Therefore, it is possible to prevent from increasing a transmission loss of the optical fiber. In addition, damage on the optical fiber that is caused by contact between the main winding body portion 1 and the optical fiber can be prevented by the shock absorbing member 5.

Next, an optical fiber winding method that is performed by using the optical fiber winding bobbin 10 will be described.

First, the optical fiber winding bobbin 10 is mounted on a rotary shaft of a winding machine (not shown) such that the optical fiber winding bobbin 10 integrally rotates with the rotary shaft.

Next, a winding-start terminal portion of the optical fiber is pasted and fixed to the pasting surface 2e of the optical fiber winding bobbin 10.

Next, when the winding machine is driven such that the optical fiber winding bobbin 10 rotates around the central axis O, the optical fiber is wound on the auxiliary winding body portion 11. After a predetermined length of optical fiber is wound on the auxiliary winding body portion 11 in this manner, the optical fiber is guided into the slit 2b and is guided onto the outer circumferential surface of the main winding body portion 1 while crossing over the main winding flange 2 in the axial direction.

Then, after a predetermined length of optical fiber is wound on the outer circumferential surface of the main winding body portion 1, the driving of the winding machine is stopped and a winding-end terminal portion of the optical fiber is cut, so that a bobbin-wound optical fiber is obtained.

Next, an effect of the optical fiber winding bobbin 10 configured as described above will be described.

A centrifugal force dF that acts on a minute mass dm in a minute portion of the main winding flange 2 when the optical fiber winding bobbin 10 rotates around the central axis O is as represented by following equation (1). In equation (1), r is a radius from the central axis O to the minute mass dm and ω is the angular velocity of the minute mass dm.

$$dF = dm \times r \times \omega^2 \quad (1)$$

In addition, a centrifugal force F that acts on the entire main winding flange 2 is a value obtained by integrating dF described above. Therefore, as the mass of a portion of the main winding flange 2 that is distant from the central axis O decreases, the centrifugal force F acting on the entire main winding flange 2 is decreased.

In one or more embodiments, as shown in FIG. 2, the thickness of the thin portion 2a of the main winding flange 2 gradually decreases toward the radially outer side. Therefore, according to one or more embodiments, it is possible to decrease the centrifugal force F acting on the main winding flange 2 in comparison with a case where the thickness of the main winding flange 2 in the radial direction.

Meanwhile, an operation of removing the optical fiber winding bobbin 10 from the above-described winding machine by pulling the outer circumferential edge 2f of the main winding flange 2 with fingers or the like may be performed after the optical fiber is wound on the optical fiber winding bobbin 10. At this time, an axial external force acts on the main winding flange 2 and a stress caused by the external force is likely to concentrate on the inner circumferential edge portion 2d of the main winding flange 2. According to one or more embodiments, it is possible to decrease the centrifugal force F while maintaining a strength against the stress concentration since the thickness of the inner circumferential edge portion 2d of the main winding flange 2 is not decreased.

In addition, for example, in a case where the thickness of a base of the main winding flange is decreased in order to decrease a centrifugal force acting on the main winding flange, rigidity of the main winding flange in the axial direction may decrease. In this case, the main winding flange may be displaced axially outward due to a pressure caused by the tension of an optical fiber when the optical fiber is wound on the main winding body portion. As a result, a gap may be formed between the axially inner surface of the main winding flange and a stacked optical fiber during a step of winding the optical fiber on the main winding body portion and thus a stacked state of the optical fiber may be collapsed. According to the optical fiber winding bobbin 10 in one or more embodiments, it is possible to prevent collapse of a stacked state of the optical fiber by maintaining the rigidity of the main winding flange 2 in the axial direction since the thickness of the inner circumferential edge portion 2d is not decreased.

In addition, in one or more embodiments, the main winding flange 2 is provided with the ribs 3 and the reinforcement ring 4 so that the rigidity of the main winding flange 2 in the axial direction is improved. Therefore, it is possible to prevent deformation of the main winding flange 2 in the axial direction.

As shown in FIG. 1, the width of the rib 3 in the circumferential direction and the radial width of the reinforcement ring 4 are small. Therefore, the masses of the ribs 3 and the reinforcement ring 4 with respect to the main winding flange 2 are sufficiently small and thus it is possible to improve the rigidity and the strength of the main winding flange 2 without significantly increasing the centrifugal force F acting on the main winding flange 2.

(Example)

The optical fiber winding bobbin 10 having a configuration described in one or more embodiments and bobbins as comparative examples thereof were subjected to a strength test with respect to rotation and deformation.

Dimensions of each optical fiber winding bobbin used in the test are shown in Table 1.

TABLE 1

| | | A | B | C |
|---|---|---|---|---|
| Main Winding Flange | Outer Diameter [mm] | 265 | 265 | 265 |
| | Thickness (Minimum Value) [mm] | 2 | 2 | 2 |
| | Thickness (Maximum Value) [mm] | 4 | 2 | 2 |
| | Thickness of Main Winding Flange including Rib (Reinforcement Ring Width) [mm] | 7 | 7 | 11 |
| Maximum Rotation Rate [rpm] | | 8500 | 6000 | 5500 |
| Amount of Deformation of Flange caused by Load (5 kg) [mm] | | 0.5 | 1.0 | 0.5 |

A bobbin A in Table 1 is the optical fiber winding bobbin 10 according to the present example. A bobbin B and a bobbin C are optical fiber winding bobbins as the comparative examples.

A sectional shape of the main winding flange 2 of the bobbin A was the same as a sectional shape shown in FIG. 2 and the axial thickness of the main winding flange 2 gradually decreased toward the radially outer side from the inner circumferential edge portion 2d. In addition, as shown in Table 1, the thickness thereof was 4 mm at the maximum and 2 mm at the minimum. Meanwhile, the axial thicknesses of the main winding flanges of the bobbin B and bobbin C were constantly 2 mm.

In addition, in the bobbins A, B, and C, the axial thickness of the main winding flange 2 including the rib 3 was equal to the axial width of the reinforcement ring 4 and a dimension thereof was as shown in Table 1.

In the present test, for each of the three types of bobbins, a rotation rate was gradually increased while measuring the vibrational acceleration of the bobbin, the increasing of the rotation rate was stopped when the vibrational acceleration reached a predetermined value, and the rotation rate measured at that time was recorded as the maximum rotation rate.

In addition, for each of the three types of bobbins, a load of 5 kgf was applied to the outer circumferential edge 2f of the main winding flange in the axial direction and the amount of deformation of the outer circumferential edge 2f in the axial direction was recorded.

As shown in Table 1, the maximum rotation rates satisfied bobbin A>bobbin B>bobbin C. It is considered that the first reason of the result as described above was that the thickness of the inner circumferential edge portion of the main winding flange of the bobbin A according to the example was larger than those of the bobbins B and C. Therefore, the strength of the inner circumferential edge portion of the bobbin A was increased in comparison with the bobbins B and C. It is considered that the second reason of the result as described above was that the thickness of a radially outer portion of the main winding flange of the bobbin A was equal to those of the bobbins B and C. Therefore, it is possible to prevent an increase in centrifugal force acting on the main winding flange, a deformation of the main winding flange which is caused by the centrifugal force, and a vibration at the time of rotation.

In addition, as shown in Table 1, the amounts of deformation of the main winding flanges at a time when a load of 5 kgf was applied to the main winding flanges in the axial direction satisfied bobbin A<bobbin B. It is considered that the reason of the result as described above was that the rigidity of the main winding flange in the axial direction was improved due to an increase in thickness of the inner circumferential edge portion of the main winding flange and thus deformation became less likely to occur. In addition, the amounts of deformation satisfied bobbin C<bobbin B. It is considered that the reason for the result described above was that the rigidity of the main winding flange in the axial direction was improved due to an increase in width of the rib or the reinforcement ring and thus deformation became less likely to occur.

From the results of the present test, it was confirmed that the bobbin A according to the present example is more durable against high-speed rotation than the bobbins B and C as the comparative examples and the main winding flange 2 thereof is less likely to be deformed by an axial external force.

As described above, according to the optical fiber winding bobbin 10 in one or more embodiments, the thin portion 2a is formed at the outer circumferential portion of the main winding flange 2. Therefore, it is possible to decrease a centrifugal force acting on the entire main winding flange 2 by decreasing the mass of the outer circumferential portion of the main winding flange 2, which generates a great centrifugal force. Furthermore, it is possible to prevent a decrease in rigidity and strength of the main winding flange 2 in the axial direction by increasing the thickness of the inner circumferential edge portion 2d of the main winding flange 2, which is connected to the main winding body portion 1.

In addition, it is possible to prevent an increase in centrifugal force acting on the entire main winding flange 2 by increasing the thickness of the inner circumferential portion 2c of the main winding flange 2, which generates a relatively small centrifugal force. Furthermore, it is possible to improve the rigidity and the strength of the inner circumferential portion 2c, on which stress is likely to concentrate when an axial external force acts on the main winding flange 2, in the axial direction.

In addition, the axial thickness of the main winding flange 2 gradually decreases toward the radially outer side. Therefore, for example, in comparison with an optical fiber winding bobbin in which the thickness of the main winding flange 2 decreases toward the radially outer side in a stepwise manner, stress is prevented from locally concentrating on the main winding flange 2 when an axial external force acts on the main winding flange 2 and the strength of the main winding flange 2 can be improved.

In addition, on the outer surface of the main winding flange 2, which faces the axially outer side, the ribs 3 and the reinforcement ring 4 that protrude outward from the main winding flange 2 are formed. Therefore, the rigidity of the main winding flange 2 in the axial direction can be further improved. In addition, since the masses of the ribs 3 and the reinforcement ring 4 are sufficiently small in comparison with the mass of the main winding flange 2, a centrifugal force acting on the entire main winding flange 2 which is generated by the masses of the ribs 3 and the reinforcement ring 4 can be made small.

In addition, according to the optical fiber winding method in one or more embodiments, it is possible to decrease a centrifugal force acting on the entire main winding flange 2 while preventing a decrease in the strength and the rigidity of the inner circumferential edge portion 2*d* of the main winding flange 2. Therefore, it is possible to improve the efficiency of a step of winding an optical fiber on the main winding body portion 1 by increasing a rotation rate at which the optical fiber winding bobbin 10 is rotated, for example.

In addition, according to the bobbin-wound optical fiber obtained by using the optical fiber winding bobbin 10 in one or more embodiments, it is possible to prevent a decrease in the strength and the rigidity of the inner circumferential edge portion 2*d* of the main winding flange 2. Therefore, it is possible to prevent deformation or the like of the main winding flange 2 that occurs in a case where an unintended great external force is applied to the main winding flange 2 when the bobbin-wound optical fiber is transported or used.

Figure 3:
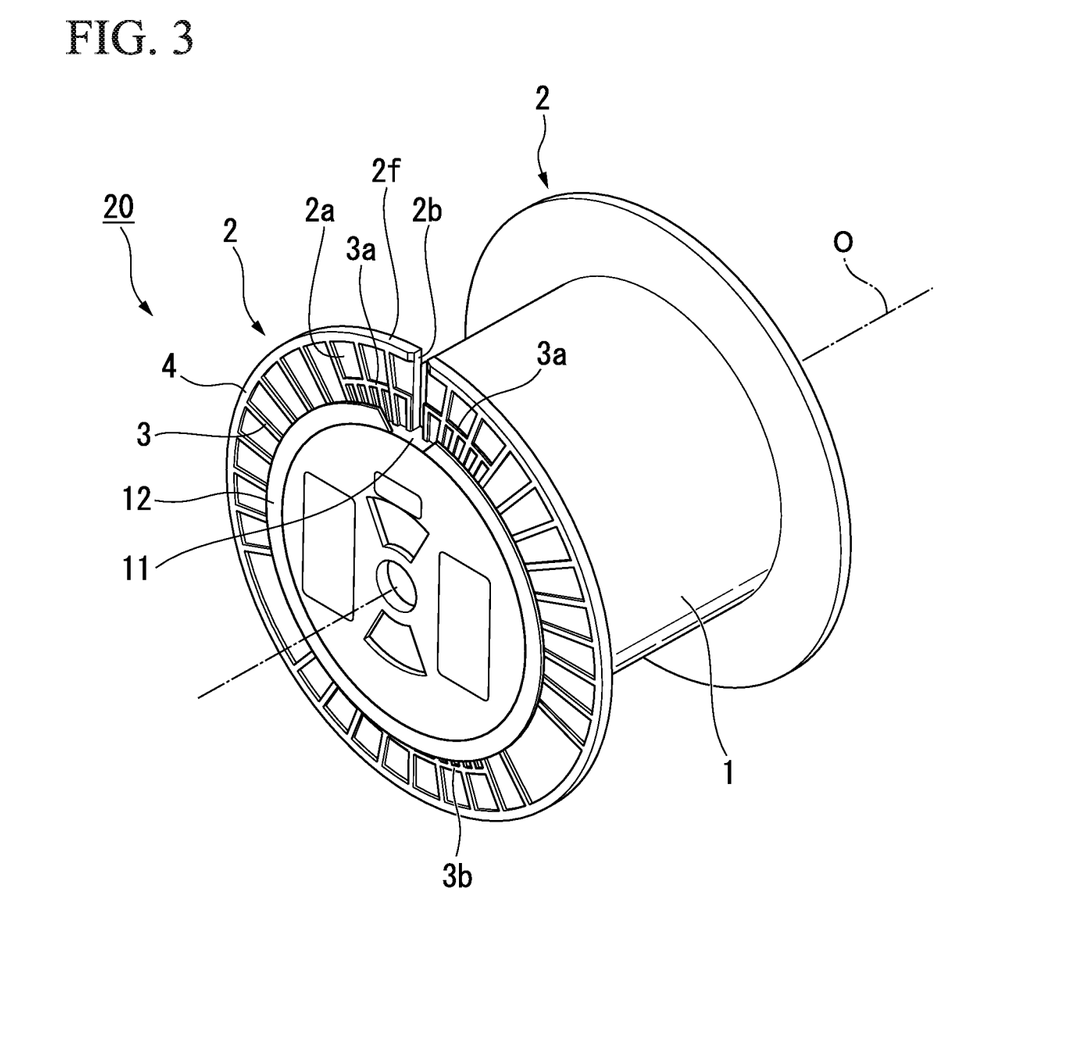
FIG. 3 is a perspective view of an optical fiber winding bobbin according to one or more embodiments.

Next, an optical fiber winding bobbin 20 according to the following one or more embodiments will be described. However, a basic configuration thereof is the same as that in the previously-described embodiments. Therefore, the same components are given the same reference numerals, description thereof will be omitted, and only a difference between the embodiments will be described.

The following one or more embodiments is different in shape of a rib formed on the main winding flange 2.

The main winding flange 2 becomes discontinuous in the circumferential direction at the slit 2*b* and thus the strength of this portion is smaller than that of the other portions. Particularly, stress caused by a centrifugal force or an axial external force acting on the main winding flange 2 is likely to concentrate on a base portion (radially inner end) of the slit 2*b*. Therefore, the main winding flange 2 may be deformed starting from the base portion of the slit 2*b* due to the stress caused by the above-described forces.

Therefore, in order to prevent deformation of the main winding flange 2 as described above, the optical fiber winding bobbin 20 in one or more embodiments is provided with ribs 3*a* shown in FIG. 3.

The ribs 3*a* are formed on portions of the outer surface of the main winding flange 2, which are adjacent to the base portion of the slit 2*b* in the circumferential direction, the outer surface facing the axially outer side. In addition, ribs 3*b* are formed on portions of the outer surface of the main winding flange 2. The ribs 3*b* are positioned on a side opposite to the portions on which the ribs 3*a* are formed in the radial direction. The central axis O is interposed between the ribs 3*a* and the ribs 3*b* in the radial direction. That is, the ribs 3*a* and the ribs 3*b* are disposed at positions which are point-symmetrical with respect to the central axis O.

According to the optical fiber winding bobbin 20 in one or more embodiments, it is possible to improve the strength and the rigidity of the base portion by forming the ribs 3*a* in the vicinity of the base portion of the slit 2*b* of the main winding flange 2, on which stress caused by a centrifugal force or an axial external force is likely to concentrate. Furthermore, the ribs 3*b* are formed on a side opposite to the base portion with the central axis O interposed therebetween. Therefore, the center of gravity of the optical fiber winding bobbin 20 is positioned on the center of the rotation. It is possible to decrease vibration, which occurs when the optical fiber winding bobbin 20 is rotated.

In addition, it should be understood that the technical scope of the invention is not limited to the above embodiments, but various modifications can be made without departing from the spirit and scope of the invention.

For example, in the previously-described embodiments, the thickness of the thin portion 2*a* of the main winding flange 2 gradually decreases toward the radially outer side. However, the invention is not limited thereto. For example, a main winding flange of which the thickness is constant over the entire length in the radial direction and recesses or through holes may be formed in an outer circumferential portion of the main winding flange may be used. Even in this case, it is possible to maintain the rigidity and the strength of the inner circumferential edge portion 2*d* of the main winding flange while decreasing a centrifugal force acting on the entire main winding flange by decreasing the mass of the outer circumferential portion.

It is also possible to appropriately replace the components in the above embodiments with known components without departing from the scope of the invention, and the above embodiments or a modification example may be appropriately combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF LETTERS OR NUMERALS

1 . . . main winding body portion, 2 . . . main winding flange, 2*a* . . . thin portion, 2*b* . . . slit, 2*c* . . . inner circumferential portion, 2*d* . . . inner circumferential edge portion, 2*f* . . . outer circumferential edge, 3 . . . rib, 4 . . . reinforcement ring

What is claimed is:
1. An optical fiber winding bobbin comprising:
   a main winding body portion having an outer circumferential surface around which an optical fiber is wound;
   a main winding flange that is disposed on one end portion of the main winding body portion in an axial direction and that protrudes radially outward; and
   a plurality of ribs that protrudes axially outward from an outer surface of the main winding flange and that is disposed on the outer surface facing an axially outer side,
   wherein the main winding flange comprises:
      an inner circumferential edge portion connected to the main winding body portion;
      a central portion;
      an outer circumferential portion having a thin portion and positioned outward from the central portion in a radial direction; and
      a slit that extends in the radial direction over an area from the inner circumferential edge portion to an outer circumferential edge of the main winding flange,
   an axial thickness of the thin portion is smaller than an axial thickness of the inner circumferential edge portion,
   the plurality of ribs comprises:
      first ribs disposed radially around the main winding flange at a predetermined interval;
      a second rib that is disposed adjacent to a radially inner end of the slit in a circumferential direction and that prevents deformation of the main winding flange caused by concentration of stress induced by the slit; and a third rib disposed on a side opposite to the portion adjacent to the radially inner end of the slit in the radial direction, wherein a central axis of the main winding flange is interposed between the second and third ribs of the outer surface in the radial direction.

2. The optical fiber winding bobbin according to claim 1, wherein the main winding flange further comprises an inner circumferential portion positioned inward from the central portion in the radial direction, and an axial thickness of the inner circumferential portion is larger than the axial thickness of the thin portion.

3. The optical fiber winding bobbin according to claim 1, wherein the axial thickness of the thin portion gradually decreases toward a radially outer side.

4. The optical fiber winding bobbin according to claim 1, further comprising a reinforcement ring that protrudes axially outward and that covers an entire circumference of an outer circumferential edge of the main winding flange.

5. The optical fiber winding bobbin according to claim 1, wherein the main winding flange has an inner side surface that faces an axially inner side and is erected with respect to the main winding body portion.

6. The optical fiber winding bobbin according to claim 1, further comprising:

a reinforcement ring that protrudes axially outward and that covers an entire circumference of an outer circumferential edge of the main winding flange, a rib that protrudes axially outward from an outer surface of the main winding flange and that is disposed on the outer surface facing an axially outer side, and an axially outer end surface of the rib and an axially outer end surface of the reinforcement ring that are formed to be flush with each other.

7. The optical fiber winding bobbin according to claim 1, wherein the second rib and the third rib are disposed more densely than the first ribs.

8. The optical fiber winding bobbin according to claim 1, wherein the second rib and the third rib are arranged in a point symmetry around the central axis of the main winding flange, and the center of gravity of the optical fiber winding bobbin is positioned on the center of the rotation.

9. An optical fiber winding method comprising:

fixing a winding-start side terminal portion of an optical fiber to the optical fiber winding bobbin according to claim 1; and winding the optical fiber on the outer circumferential surface of the main winding body portion by rotating the optical fiber winding bobbin.

10. A bobbin-wound optical fiber comprising:

the optical fiber winding bobbin according to claim 1; and an optical fiber wound on the optical fiber winding bobbin.

* * * * *